United States Patent
Penny et al.

(10) Patent No.: US 10,326,757 B2
(45) Date of Patent: *Jun. 18, 2019

(54) TECHNOLOGIES FOR ENHANCING COMPUTER SECURITY

(71) Applicant: KARA PARTNERS LLC, Midlothian, VA (US)

(72) Inventors: Brian Penny, Astoria, NY (US); Desmond Penny, Astoria, NY (US)

(73) Assignee: KARA PARTNERS LLC, Midlothian, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/051,794

(22) Filed: Aug. 1, 2018

(65) Prior Publication Data

US 2018/0343244 A1   Nov. 29, 2018

Related U.S. Application Data

(63) Continuation of application No. 15/276,380, filed on Sep. 26, 2016, now Pat. No. 10,057,250, which is a (Continued)

(51) Int. Cl.
*H04L 29/06* (2006.01)
*G06F 21/31* (2013.01)
(Continued)

(52) U.S. Cl.
CPC ............ *H04L 63/083* (2013.01); *G06F 21/31* (2013.01); *H03M 7/08* (2013.01); *H04L 63/00* (2013.01); *H04L 67/06* (2013.01)

(58) Field of Classification Search
USPC ............... 726/7, 26, 2; 713/168; 380/28, 42
See application file for complete search history.

(56) References Cited

U.S. PATENT DOCUMENTS

| 4,214,206 A | 7/1980 | Everaarts |
| 4,568,916 A | 2/1986 | Bahgat |

(Continued)

FOREIGN PATENT DOCUMENTS

| WO | WO0046796 | 8/2000 |
| WO | WO2007029330 | 3/2007 |
| WO | WO2011055971 | 5/2011 |

OTHER PUBLICATIONS

Bai et al. "Variable Size Block Encryption using Dynamic-key Mechanism (VBEDM)" In: International Journal of Computer Applications (0975-8887), vol. 27, No. 7, Aug. 2011, pp. 27-30, [online] [retrieved on Jan. 3, 2018 (Jan. 3, 2018)] Retrieved from the Internet <URL: https://www.researchgate.net/publication/268377625_Variable_Size_Block_Encryption_using_Dynamic-key_Mechanism_VBEDM>, entire document, especially Abstract; Figure 1; pp. 1-3.
(Continued)

*Primary Examiner* — Amare F Tabor
(74) *Attorney, Agent, or Firm* — Troutman Sanders, PLL; Dustin Weeks; Brennan Carmody

(57) ABSTRACT

A system including: at least one processor; and at least one memory, having stored thereon computer program code that, when executed by the at least one processor, controls the at least one processor to: receive a first sequence of values; segment the first sequence of values into a first subsequence having a first length and a second subsequence having a second length; modify the first subsequence by inserting one or more values into the first subsequence to create a modified first subsequence of a third length; modify the second subsequence by one or more inserting values into the second subsequence to create a modified second subsequence of the third length; combine the modified first subsequence and the modified second subsequence to create a second sequence of values; and output the second sequence of values.

20 Claims, 4 Drawing Sheets

Related U.S. Application Data continuation of application No. 14/307,712, filed on Jun. 18, 2014, now Pat. No. 9,454,653, which is a continuation of application No. 14/120,315, filed on May 14, 2014, now abandoned.

(60) Provisional application No. 61/822,974, filed on May 14, 2013.

(51) Int. Cl.
*H03M 7/08* (2006.01)
*H04L 29/08* (2006.01)

(56) References Cited

U.S. PATENT DOCUMENTS

| | | | |
|---|---|---|---|
| 5,249,220 A | 9/1993 | Moskowitz et al. | |
| 6,226,607 B1 | 5/2001 | Chang et al. | |
| 6,425,107 B1 | 7/2002 | Caldara et al. | |
| 6,728,893 B1 | 4/2004 | Wells et al. | |
| 6,954,770 B1 | 10/2005 | Carlson et al. | |
| 7,174,355 B2 | 2/2007 | Henry et al. | |
| 7,194,496 B2 | 3/2007 | Morris | |
| 7,478,241 B2 * | 1/2009 | Le Floch | G06T 1/0035 713/176 |
| 7,664,937 B2 * | 2/2010 | Jacob | G06F 21/14 712/205 |
| 7,752,247 B2 | 7/2010 | Wilber | |
| 8,085,100 B2 | 12/2011 | Brennan | |
| 8,209,367 B2 | 6/2012 | Radja et al. | |
| 8,245,050 B1 | 8/2012 | Subramanian et al. | |
| 8,429,637 B2 * | 4/2013 | Myles | G06F 21/14 712/208 |
| 8,443,020 B2 | 5/2013 | Matsui | |
| 8,473,738 B2 * | 6/2013 | Osmolovsky | H03M 13/134 380/28 |
| 8,625,782 B2 * | 1/2014 | Rane | H04L 9/008 380/28 |
| 8,667,025 B2 * | 3/2014 | Alexander | H04L 9/0656 707/793 |
| 8,838,954 B2 | 9/2014 | Tian et al. | |
| 8,948,384 B2 | 2/2015 | Bae | |
| 9,454,653 B1 | 9/2016 | Penny et al. | |
| 2002/0044655 A1 | 4/2002 | Applebaum | |
| 2002/0164020 A1 | 11/2002 | Mustafa | |
| 2005/0033981 A1 | 2/2005 | Tsurumaki | |
| 2006/0034455 A1 | 2/2006 | Damgaard et al. | |
| 2006/0065749 A1 | 3/2006 | Sankey et al. | |
| 2006/0244544 A1 | 11/2006 | Suzuki | |
| 2006/0291650 A1 | 12/2006 | Ananth | |
| 2007/0101129 A1 | 5/2007 | Wong et al. | |
| 2008/0226077 A1 | 9/2008 | Kamibayashi et al. | |
| 2008/0319982 A1 | 12/2008 | Yu et al. | |
| 2009/0013390 A1 | 1/2009 | Li | |
| 2009/0037986 A1 | 2/2009 | Baker | |
| 2009/0172266 A1 | 7/2009 | Kimura | |
| 2010/0146303 A1 | 6/2010 | Kothari et al. | |
| 2010/0212020 A1 | 8/2010 | Wong et al. | |
| 2011/0107112 A1 | 5/2011 | Resch | |
| 2011/0225638 A1 | 9/2011 | Nahari | |
| 2012/0226725 A1 | 9/2012 | Yang | |
| 2013/0044881 A1 | 2/2013 | Chang | |
| 2013/0046973 A1 | 2/2013 | Resch | |
| 2013/0094650 A1 | 4/2013 | Mendel | |
| 2013/0129088 A1 | 5/2013 | Alvarez Maranon et al. | |
| 2014/0279776 A1 | 9/2014 | Brown et al. | |
| 2015/0082020 A1 | 3/2015 | Thompson | |

OTHER PUBLICATIONS

International Search Report dated Jan. 23, 2018 in corresponding Application No. PCT/US2017/053254.

* cited by examiner

TECHNOLOGIES FOR ENHANCING COMPUTER SECURITY

CROSS-REFERENCE TO RELATED APPLICATION

The present application is a continuation of U.S. patent application Ser. No. 15/276,380, filed Sep. 26, 2016 entitled "Technologies for Enhancing Computer Security", which is a continuation of U.S. patent application Ser. No. 14/307,712 filed Jun. 18, 2014, now U.S. Pat. No. 9,454,653 entitled "Technologies for Enhancing Computer Security" which claims priority to U.S. patent application Ser. No. 14/120,315, filed on May 14, 2014, which claims priority to U.S. Provisional Application No. 61/822,974 filed May 14, 2013, the contents of which are hereby incorporated by reference in their entirety as if fully set forth herein.

FIELD

Generally, the present disclosure relates to computer security. More particularly, the present disclosure relates to technologies for enhancing computer security.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure may be concerned with. Further, nothing is disclaimed.

Many computerized technologies rely on various methods for user authentication and/or access control. One of such methods involves password entry, which can be based at least in part on alphanumeric input, symbolic input, biometric input, hardware input and/or others. However, despite pervasiveness of such method for user authentication and/or access control, password hacking/cracking is still prevalent. Accordingly, more effective technologies for user authentication and/or access control are desired.

BRIEF SUMMARY

The present disclosure may at least partially address at least one of the above. However, the present disclosure may prove useful to other technical areas. Therefore, the claims should not be construed as necessarily limited to addressing any of the above.

According to an example embodiment of the present disclosure a method is provided. The method is performed via a computer. The method includes providing a plurality of variables and a variable. The variables differ from each other. The variables differ from the variable. The method includes providing a lookup table indexing a plurality of characters via a plurality of values based on a first numeral system. The method includes converting a message into a first sequence of values based on the table. The method includes converting the first sequence into a second sequence of values based on a second numeral system different from the first system and according to a preset format. The method includes combining the second sequence into a single sequence via removing the format. The method includes generating a first plurality of subsequences from the single sequence based on segmentation of the sequence via alternating the variables. The method includes converting the first subsequences into a second plurality of subsequences such that each of the second subsequences is sized according to the variable. The method includes transmitting the second subsequences.

The present disclosure may be embodied in the form illustrated in the accompanying drawings. However, attention is called to the fact that the drawings are illustrative. Variations are contemplated as being part of the disclosure, limited only by the scope of the claims.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

DETAILED DESCRIPTION

Figure 1:
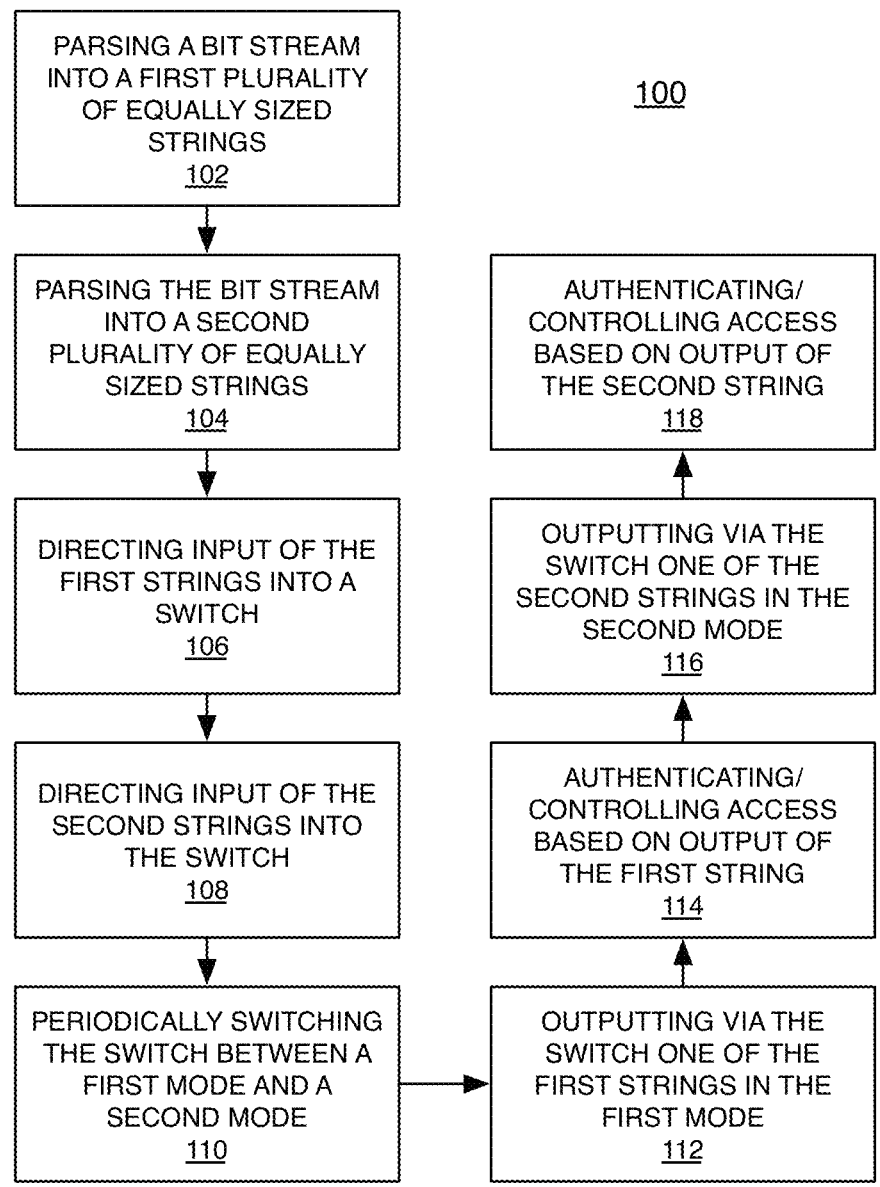
FIG. 1 shows a flowchart of an example embodiment of a method for enhancing computer security according to the present disclosure.

The present disclosure will now be described more fully with reference to the accompanying drawings, in which example embodiments of the disclosure are shown. The disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Features described with respect to certain embodiments may be combined in various other embodiments. Different aspects and elements of the embodiments may be combined in a similar manner. The disclosed embodiments may individually and/or collectively be components of a larger system, wherein other procedures may take precedence over and/or otherwise modify their application. A number of steps may be required before, after, and/or concurrently with the disclosed embodiments. Processes disclosed herein can be performed by one and/or more entities in any way according to the principles of the present disclosure.

The terminology used herein can imply direct or indirect, full or partial, action or inaction. For example, when an element is referred to as being "on," "connected" or "coupled" to another element, then the element can be directly connected or coupled to the other element or intervening elements may be present. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and will not be interpreted in an idealized or overly formal sense unless expressly so defined herein.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

FIG. 1 shows a flowchart of an example embodiment of a method for enhancing computer security according to the present disclosure.

A process 100 includes blocks 102-118. Process 100 can be implemented via any combination of hardware logic, such as in one and/or more circuits on any hardware level, and/or software logic, such as in one and/or more software applications, which can be implemented below, on and/or above operating system level. Process 100 can be implemented in request-response computing. Process 100 can be a part of a larger process, irrespective of any relation to computer security. For example, various functions can be taking place before, during and/or after performance of any one and/or more blocks of process 100. Alternatively, process 100 can be performed on its own. Although blocks 102-118 can be performed in order as described herein, blocks 102-118 can be performed in other orders, with some blocks being performed before, during and/or after other blocks in any permutation thereof. Also, note that process 100 can be implemented with password entry, which can be based at least in part on alphanumeric input, symbolic input, biometric input, hardware input and/or others. However, process 100 can also be implemented without use of passwords.

Block 102 includes parsing a bit stream into a first plurality of equally sized strings. The bit stream includes a continuous sequence of bits, such as 101001001011110011, representing a stream of data over a medium. Such data can be of any type and/or for any purpose. The stream can be provided and/or received in a wired manner and/or in wireless manner. The stream can be communicated over a communication path via a communications protocol, such as a transmission control protocol (TCP), a user datagram protocol (UDP), and/or other network communication protocols of any communication range, and/or in computer memory and/or computer storage, such as a circuit, a non-volatile memory device, and so forth. The stream can be of any bit amount. The bit stream can contain information identifying a bit stream source and a bit stream destination. The bit stream can be a byte stream as well. The parsing into the first strings includes segmenting the bit stream into the first strings of any digit size, such as two, five, ten or any other number. For example, when the bit stream includes 101001001011110011, then such stream can be parsed into six digit strings, such as 101001, 001011, 110011 and so forth. The parsing into the first strings can occur on the entire bit stream and/or portions and/or sub-portions of the bit stream, irrespective of their size and/or relationship to each other. The parsing can be performed with and/or without interfering with the integrity of the bit stream. The parsing can be performed via at least one oscillator/clock. Alternatively, the sequence can be based on a different symbolic and/or numeral system, such as hexadecimal.

Block 104 includes parsing the bit stream into a second plurality of equally sized strings. The parsing into the second strings includes segmenting the bit stream into the second strings of any digit size, such as two, five, ten or any other number. For example, when the bit stream includes 101001001011110011, then such stream can be parsed into nine digit strings, such as 101001001, 011110011 and so forth. The parsing into the second strings can occur on the entire bit stream and/or portions and/or subportions of the bit stream, irrespective of their size and/or relationship to each other. The first strings have different size from the second strings. Although the first strings and the second strings are formed from parsing an identical portion of the bit stream, in other alternative embodiments, the first strings and the second strings can be formed from parsing different portions of the bit stream. The first strings can have different bit value from the second strings. The first strings can have identical bit value as the second strings. The first strings and the second strings can be equally sized and/or unequally sized. Block 102 and block 104 can be performed contemporaneously, concurrently and/or at different times by at least one entity. Block 104 can be performed before or after block 102. The parsing can be performed with and/or without interfering with the integrity of the bit stream. The parsing can be performed via at least one oscillator/clock.

Block 106 includes directing input of the first strings into a switch. The directing can include inputting at least one of the first strings into the switch. Alternatively, the directing can include sending at least one of the first strings into the switch. Also alternatively, the directing can include receiving at least one of the first strings via the switch. Also alternatively, the directing can include transmitting at least one of the first strings into the switch. The directing can be switch input demand based. The directing can be wired and/or wireless. The directing can be direct and/or indirect. The directing can be encrypted and/or unencrypted.

Block 108 includes directing input of the second strings into the switch. The directing can include inputting at least one of the second strings into the switch. Alternatively, the directing can include sending at least one of the second strings into the switch. Also alternatively, the directing can include receiving at least one of the second strings via the switch. Also alternatively, the directing can include transmitting at least one of the second strings into the switch. The directing can be switch input demand based, irrespective of any relation to any performance of block 106. Block 106 and block 108 can be performed contemporaneously, concurrently and/or at different times by at least one entity. Block 106 can be performed before or after block 108. The directing can be wired and/or wireless. The directing can be direct and/or indirect. The directing can be encrypted and/or unencrypted.

Block 110 includes periodically switching the switch between a first mode and a second mode. The switch can be hardware based, such as a circuit, and/or software based. The switch can be an A/B switch. Alternatively, the switch can be an A/B/n switch with n corresponding to a number of modes between which the switch can switch, which can be any, such as five, seven, nine, twenty and so forth. Periodically can be based on any time period, such as a milliseconds, seconds, minutes, hours and so forth. Such periodic switching is automatic. Such period can correspond to mode duration of the switch. The switching is based on a clock, an oscillator, a processor, and hardware and/or software logic. For example, such switching is every 30 seconds based on a clock. Therefore, for every 30 seconds, an A/B switch iteratively switches from the first mode to the second mode and from second mode to the first mode. Similarly, for every 30 seconds, an A/B/n switch iteratively switches from the first mode to the second mode, from the second mode to the n mode, and from the n mode to the first mode. Block 110 can be performed before, concurrently and/or at different times from any and/or all of blocks 102-108.

Block 112 includes outputting via the switch one of the first strings in the first mode. For example, when one of the first strings is 101001, then during the first mode, the switch outputs 101001. More than one string can be output in the first mode.

Block 114 includes authenticating/controlling access based on output of the first string. Therefore, when the switch outputs 101001, then the authenticating/controlling access is based on correct input of password 101001, whether in a binary form and/or another form, such as alphanumeric, symbolic, biometric and so forth. Block 112 and block 114 can be performed contemporaneously, concurrently and/or at different times by at least one entity. Block 112 can be performed before or after block 114.

Block 116 includes outputting via the switch one of the second strings in the second mode. For example, when one of the second strings is 101001001, then during the second mode, the switch outputs 101001001. More than one string can be output in the second mode.

Block 118 includes authenticating/controlling access based on output of the second string. Therefore, when the switch outputs 101001001, then the authenticating/controlling access is based on correct input of password 101001001, whether in a binary form and/or another form, such as alphanumeric, symbolic, biometric and so forth. Block 116 and block 118 can be performed contemporaneously, concurrently and/or at different times by at least one entity. Block 116 can be performed before or after block 118. Any and/or all blocks 112 and/or 114 can be performed after any and/or all blocks 116 and/or 118.

Using examples herein, when the switch switches back from the second mode to the first mode, then the switch outputs the next one of the parsed first strings. Therefore, in the next iteration of the switch in the first mode, the switch outputs 001011. Similarly, when the switch again switches to the second mode, then the switch outputs the next one of the parsed second string. Therefore, in the next iteration of the switch in the second mode, the switch outputs 011110011. Since such outputs function as passwords, authentication/access control is based on switching passwords, which when implemented, for example in a computer system, enhance security of the computer system. Resultantly, a computer outputting such code can be authenticated and/or granted access since such structure could not be figured out and/or reproduced without knowledge of original technological specifications, which can be preprogrammed in advance, such as via provision of a character sequence and subsequence generation methods. Such authentication/access control can facilitate in new computer language creation due to variation of what a byte is.

Note that the bit stream can be parsed into more than two pluralities of equally sized strings. For example, the bit stream can be split into any number of equally sized strings, such as three, nine, ten, twenty and so forth. The switch can switch between more than two modes. For example, the switch can switch between a plurality of modes, such as three, nine, ten, twenty and so forth. Accordingly, the switch can output based on the pluralities of equally sized strings in the plurality of modes. Such switch output can be used to authenticate/control access based on the pluralities of strings. Also, note that the switch can be local, such as a part of the computer or in a same locale as the computer, or the switch can be remote, such as network-accessible via the computer. Note that the switch can also be shared between the computers.

Figure 2:
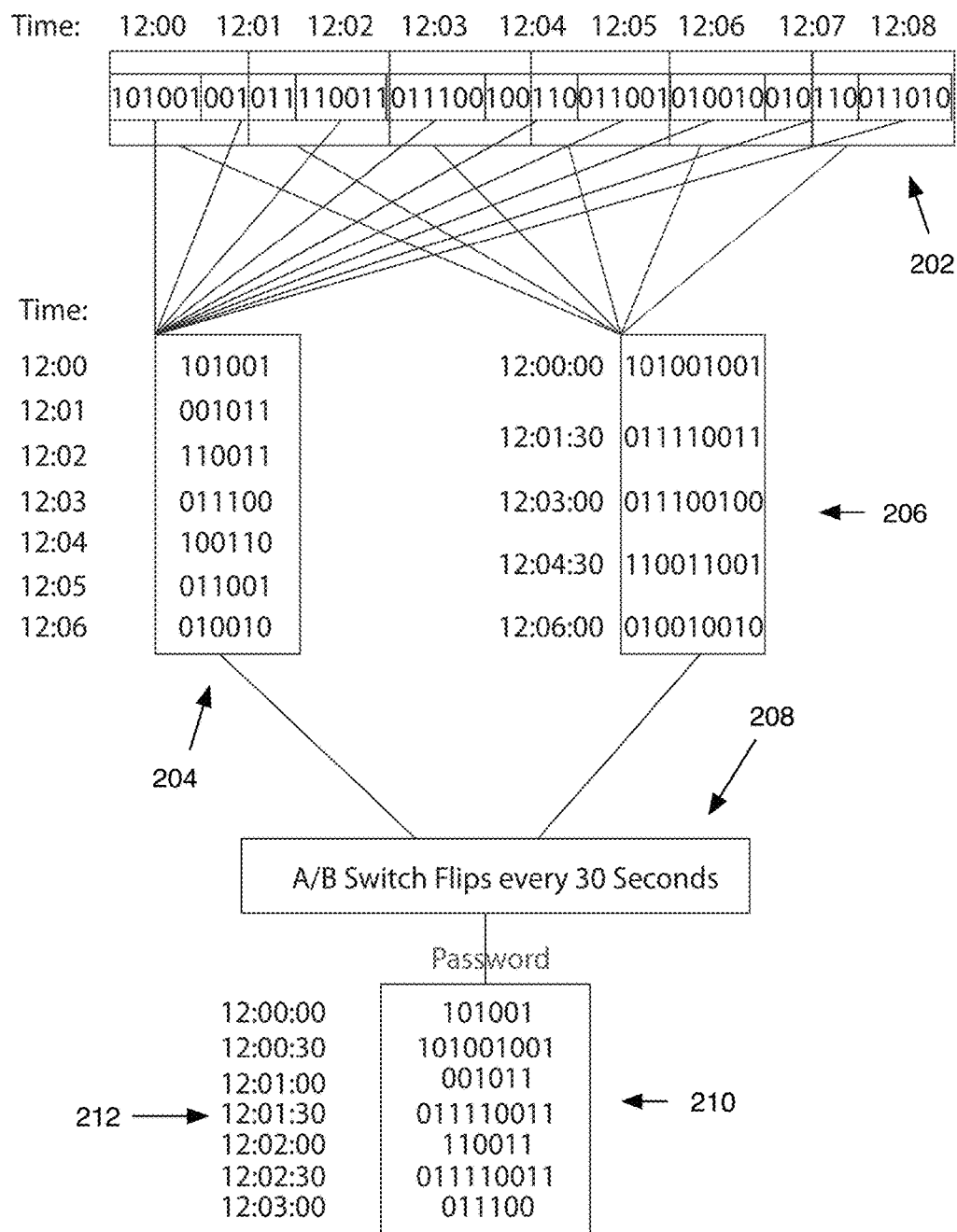
FIG. 2 shows a flow sheet of an example embodiment of a method for enhancing computer security according to the present disclosure.

FIG. 2 shows a flow sheet of an example embodiment of a method for enhancing computer security according to the present disclosure. Some elements of this figure are described above. Thus, same reference characters identify same or like components described above and any repetitive detailed description thereof will hereinafter be omitted or simplified in order to avoid complication.

A bit stream 202 is shown. Stream 202 contains a plurality of bits. Stream 202 is parsed into a first plurality of equally sized strings 204 and a second plurality of equally sized strings 206. The parsing can be performed via at least one oscillator/clock, such as one oscillator/clock operating according to one frequency and parsing into strings 204 and another oscillator/clock operating according to another frequency and parsing into strings 206. Strings 204 are parsed based on six digit segmentation and strings 206 are parsed based on nine digit segmentation. Therefore, strings 204 and strings 206 are different in bit size and have different string values. However, such segmentation can be based on any digit size and/or can share at least one value. The parsing into strings 204 and 206 can be performed contemporaneously, concurrently and/or at different times by at least one entity. Note that bit stream 202 can be the entire bit stream or a portion of some bit stream.

Each of the strings 204 is uniquely assigned to a plurality of first time periods. Such assignment can be performed on a one-to-one basis, one-to-many basis, many-to-one basis and/or many-to-many basis. For example, each of the strings 204 uniquely one-to-one corresponds to each of the first time periods, such as 1 sec per string. Similarly, each of the strings 206 is uniquely assigned to a plurality of second time periods. Such assignment can be performed on a one-to-one basis, one-to-many basis, many-to-one basis and/or many-to-many basis. For example, each of the strings 206 uniquely one-to-one corresponds to each of the second time periods, such as ½ second per string. Note that the first time periods and the second time periods start from a same point of reference or time zero. Note that the strings 204 and the strings 206 are contained via at least two different computers.

Strings 204 and strings 206 are then directed for input into a switch 208. As shown, switch 208 is an AB switch automatically flipping back and forth between a first mode A and a second mode B every 30 seconds. However, switch 208 can be modal according to any number of modes and switch 208 can iterate through such modes as described herein. Further, switch 208 can receive input from other inputs whether related and/or unrelated to technologies as described herein. Strings 204 and strings 206 can be directed in any manner, whether contemporaneously, concurrently and/or at different times by at least one entity. At least one of strings 204 and at least one of strings 206 is input into switch 208, whether contemporaneously, concurrently and/or at different times by at least one entity. Switch 208 can be flipped for any time period based on any time measurement, such as a nanosecond, a millisecond, a second, a minute, an hour and so forth. Switch 208 flips automatically, which can include manual initial activation. Switch 208 switches based on a clock, an oscillator, a processor, and hardware and/or software logic. As shown, switch 208 switches every 30 seconds based on a clock. Therefore, for every 30 seconds, an AB switch iteratively switches from the first mode to the second mode and from second mode to the first mode. Note that input into the switch can be based on a first-in-first-out (FIFO) methodology.

A plurality of time periods 212 is based on combination of the first time periods and the second time periods as shown with reference with strings 204 and strings 206. Time periods 212 can be based on different time measurements, such as time associated with strings 204 is based on seconds and time associated with strings 206 is based on milliseconds. Such different time measurements can be of any type.

When switch 208 is in the first mode, which can be the A mode, then at 12:00:00 as shown in time periods 212, switch 208 outputs one of strings 204, which as shown is 101001. Based on such output, authentication/controlling access is performed. For example, during the first mode, a password 210 can be 101001 or its value, such as in a decimal or a hexadecimal system, whether in a binary form and/or another form, such as alphanumeric, symbolic, biometric and so forth.

At 12:00:30 as shown in time periods 212, switch 208 flips to the second mode, which can be the B mode. During the second mode, switch 208 outputs one of strings 206, which as shown is 101001001. Based on such output, authentication/controlling access is performed. For example, during the second mode, password 210 can be 101001001 or its value, such as in a decimal or a hexadecimal system, whether in a binary form and/or another form, such as alphanumeric, symbolic, biometric and so forth.

At 12:01:00 as shown in time periods 212, switch 208 flips back to the first mode, which can be the A mode. During the first mode, switch 208 outputs the next one of strings 206, which as shown is 001011. Based on such output, authentication/controlling access is performed. For example, during the first mode, password 210 can be 001011 or its value, such as in a decimal or a hexadecimal system, whether in a binary form and/or another form, such as alphanumeric, symbolic, biometric and so forth. Such switch 208 flipping can continue indefinitely or until some condition is met. Since password 210 is switching as time as indicated by time periods 212 goes on, security of a computer system can be enhanced.

Note that bit stream 202 can be parsed into more than two pluralities of equally sized strings. For example, bit stream 202 can be split into any number of equally sized strings, such as three, nine, ten, twenty and so forth. Switch 208 can switch between more than two modes. For example, switch 208 can switch between a plurality of modes, such as three, nine, ten, twenty and so forth. Accordingly, switch 208 can output based on the pluralities of equally sized strings in the plurality of modes. Such switch 208 output can be used to authenticate/control access via password 210 based on the pluralities of strings.

For example, stream 202 and a plurality of different stream segmentation algorithms are provided to a plurality of computers, such as via preprogramming. Each of the computers segments stream 202, based on the algorithms, to result in strings 204 and strings 206, which are different from each other in size and/or value based on the algorithms. Strings 204 and strings 206 are input into local switch 208 alternating between a plurality of modes. The computers communicate with each based on password 210, which changes based on the switch alternating. Password 210 is periodically changed, according to time periods 212, based on alternating input from strings 204 and strings 206. The input is alternated according to the switch alternating between the modes. For the computers, password 210 change is synchronous, such as based on alternating of switch 208, but can be asynchronous. Also, for the computers, note that at least one of generation of strings 204 and strings 206 is synchronous, such as based on a clock, but can be asynchronous. Further, for the computers, note that input into switch 208 is synchronous, such as based on a clock, but can be asynchronous.

Figure 3:
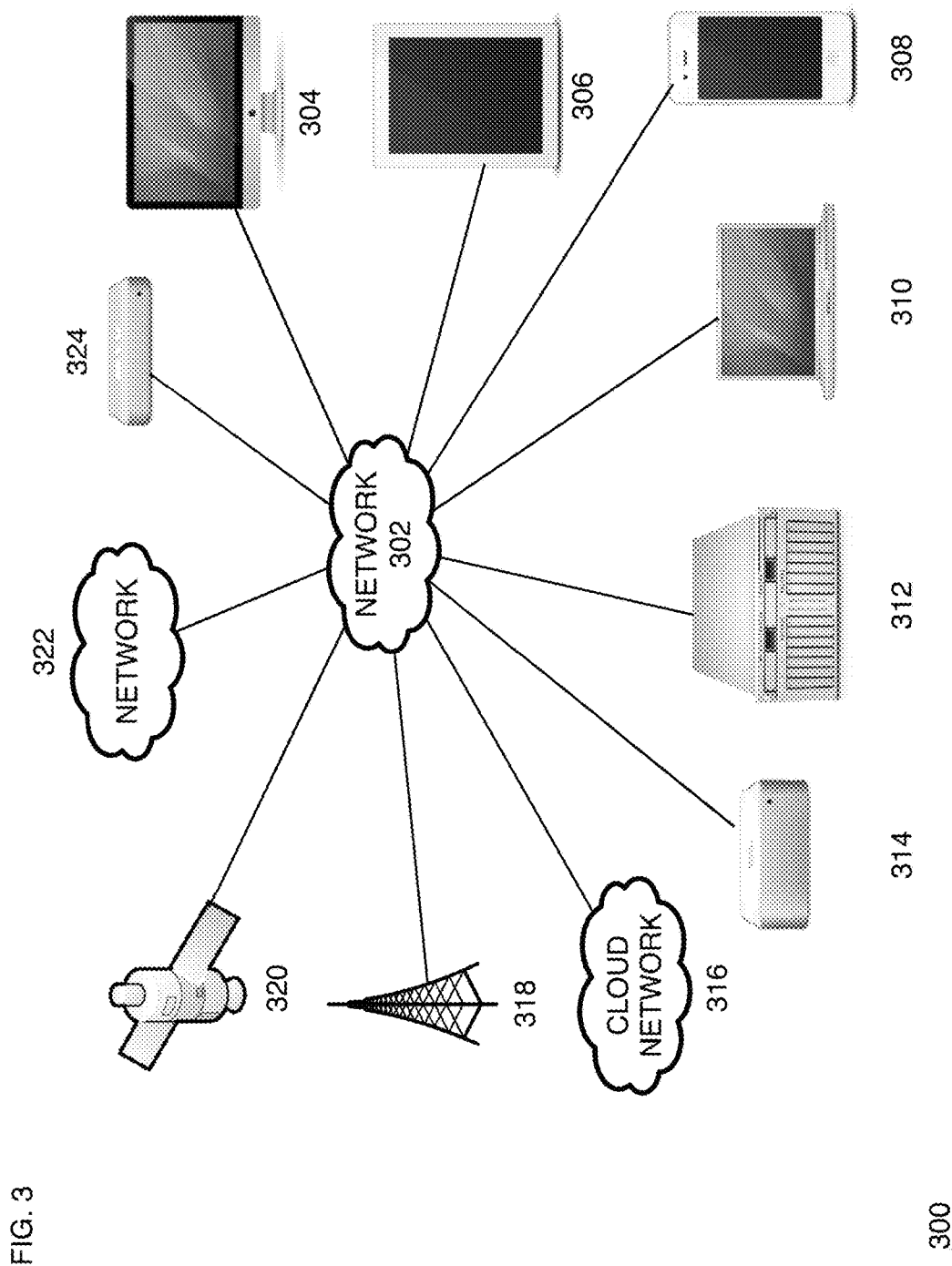
FIG. 3 shows a diagram of an example embodiment of a network according to the present disclosure.

FIG. 3 shows a diagram of an example embodiment of a network according to the present disclosure. Some elements of this figure are described above. Thus, same reference characters identify same or like components described above and any repetitive detailed description thereof will hereinafter be omitted or simplified in order to avoid complication.

A network diagram 300 depicts a network 300 in communication with at least a desktop computer 304, a tablet computer 306, a mobile phone 308, a laptop computer 310, a mainframe 312, a server 314, a cloud computing network 316, a communication tower 318, a satellite 320, another network 322 and a networking device 324. Such communication can be direct and/or indirect, wired and/or wireless, encrypted and/or unencrypted. Network 302 and/or network 322 can include Internet. More than one instance of any elements shown in diagram 300 can be included. Any and/or all elements shown in diagram 300 can communicate with any and/or all elements shown in diagram 300 in any way, whether wired and/or wirelessly. Any and/or all of such communications can be performed in any manner using technology as described in reference to FIG. 1 and FIG. 2. For example, a bit stream is received and parsed according to a first frequency of a first oscillator in a first manner and parsed according to a second frequency of a second oscillator in a second manner different from the first. The outputs of the first oscillator and the second oscillator are combined and used as a switch switching between alternatively outputting strings for network devices to focus on. When such output is incorporated into network communications, if output between communicating network devices are not identical, then such network communications are not allowed due to a changing authentication/access control condition.

In some example embodiments, the disclosed technologies can facilitate variation of what a byte is. Resultantly, the oscillation/clocking signal varies the bit length of how to segment the bit stream by parsing the bit stream into a variety of bit lengths to reinterpret the bit stream with the lengths encoding differently than network devices that interpret the bit stream into 8-bits, 16-bits and/or 64-bit increments. The length of bit stream increment is based on oscillator/clock frequency. At least two oscillators/clocks are used with a first oscillator/clock to generate the parsing or bit division and a second oscillator/clock synchronous to the first clock that interprets the parsing correctly. Without knowing the frequency of the first clock, the receiver of the signal will not be able to interpret the signal correctly using the standard 8-bit parsing. Thus, when a pair of oscillators/clocks having different frequencies are combined and their oscillations combined, then such combination creates a new waveform pattern that appears random, but does eventually repeat. The clocks can be atomic clocks, crystal based clocks, mechanical clocks and so forth. In some example embodiments, such technology can be combined with an identification number to create more secure network device access, irrespective of network device.

Figure 4:
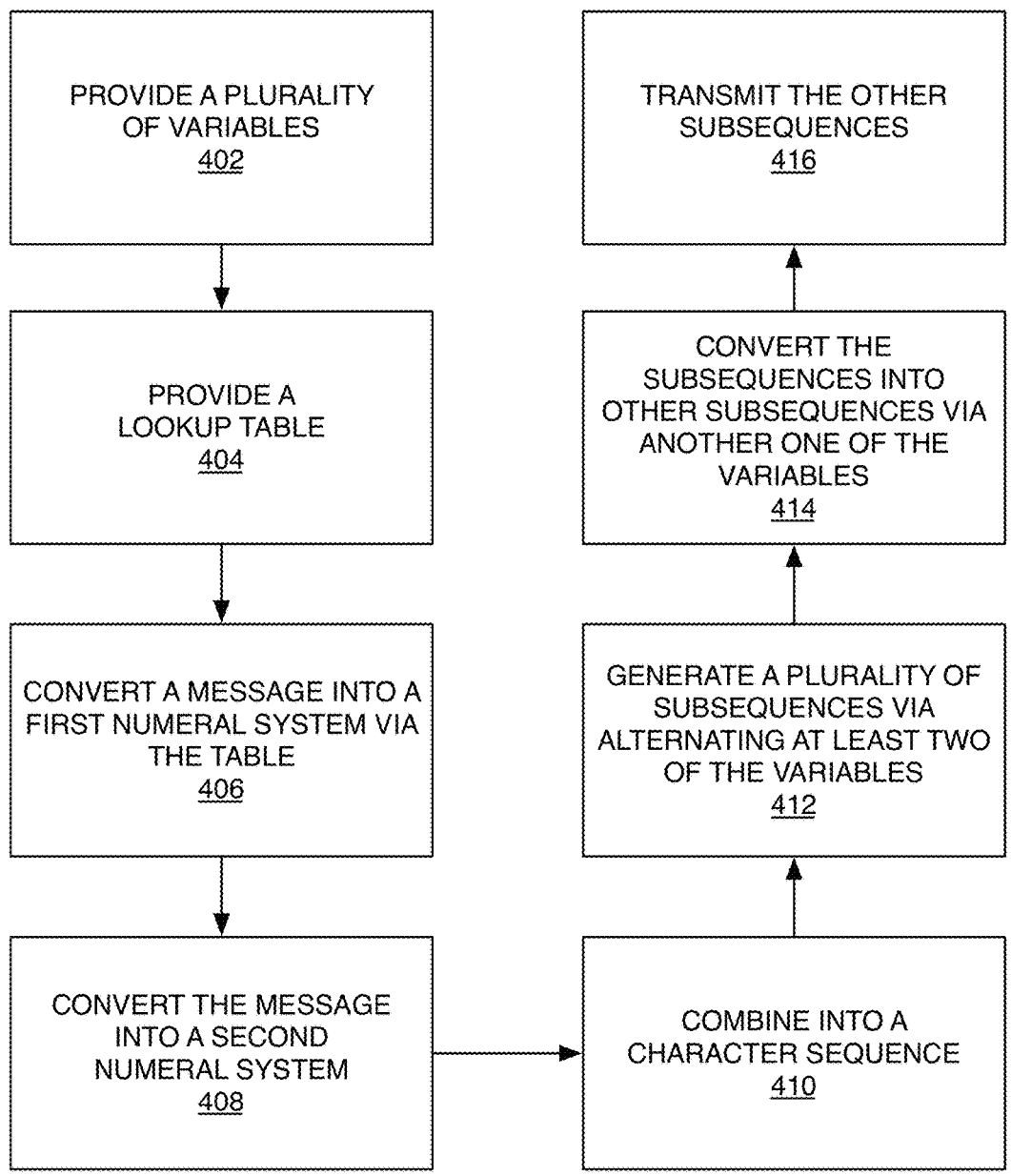
FIG. 4 shows a flowchart of another example embodiment of a method for enhancing computer security according to the present disclosure.

FIG. 4 shows a flowchart of another example embodiment of a method for enhancing computer security according to the present disclosure. Some elements of this figure are described above. Thus, same reference characters identify same or like components described above and any repetitive detailed description thereof will hereinafter be omitted or simplified in order to avoid complication.

A process 400 includes blocks 402-416. Process 400 is for encoding and decoding logic using variable lookup tables and/or word length. Process 400 can be implemented via any combination of hardware logic, such as in one and/or more circuits on any hardware level, and/or software logic, such as in one and/or more software applications, which can be implemented below, on and/or above operating system level. Process 400 can be implemented in request-response computing. Process 400 can be a part of a larger process, irrespective of any relation to computer security. For example, various functions can be taking place before, during and/or after performance of any one and/or more blocks of process 400. Alternatively, process 400 can be performed on its own. Although blocks 402-416 can be performed in order as described herein, blocks 402-416 can be performed in other orders, with some blocks being performed before, during and/or after other blocks in any permutation thereof Also, note that process 400 can be implemented with password entry, which can be based at least in part on alphanumeric input, symbolic input, biometric input, hardware input and/or others. However, process 400 can also be implemented without use of passwords.

In block 402, a plurality of variables are provided. Such provision can be manual and/or automatic, encrypted and/or unencrypted, wired and/or wireless, direct and/or indirect. Note that any number of variables can be used. For example, variable A, variable B, and variable C are provided where variable A is set to 17, variable B is set to 13, and variable C is set to 24. Note that the variables are in one numeral system, but in other embodiments, are in different numeral systems.

In block 404, a lookup table is provided. Such provision can be manual and/or automatic, encrypted and/or unencrypted, wired and/or wireless, direct and/or indirect. The table indexes a symbolic library, such as an alphanumeric library via a plurality of decimal values corresponding to the alphanumeric library. For example, a lookup table is provided below. Note that other types of lookup tables and different indexing libraries can be used as well, such as via other symbols, other numeral systems, and so forth.

| Lookup Table | |
| --- | --- |
| 1 | a |
| 2 | b |

| Lookup Table | |
| --- | --- |
| 3 | c |
| 4 | d |
| 5 | e |
| 6 | f |
| 7 | g |
| 8 | h |
| 9 | i |
| 10 | j |
| 11 | k |
| 12 | l |
| 13 | m |
| 14 | n |
| 15 | o |
| 16 | p |
| 17 | q |
| 18 | r |
| 19 | s |
| 20 | t |
| 21 | u |
| 22 | v |
| 23 | w |
| 24 | x |
| 25 | y |
| 26 | z |
| 27 | _ |

In block 406, a message is converted into a first numeral system via the lookup table. Such conversion is automatic and can be for any type of numeral system. The message can be manually and/or automatically generated, such as for telecommunications. The message is textual, but can be of any type. For example, if the message is hello_world, then, via the lookup table, the message is converted into a decimal system such that h=8, e=5, l=12, l=12, o=15, _=27, w=23, o=15, r=18, l=12, d=4.

In block 408, the message, as manifested via the first numeral system, is converted into a second numeral system different from the first system. Such conversion is automatic, whether directly and/or indirectly, and can be for any type of numeral system, such as hexadecimal. Using the example above where h=8, e=5, l=12, l=12, o=15, _=27, w=23, o=15, r=18, l=12, d=4, then such values are converted into a binary numeral system, which is different from the decimal system. Therefore, using 8 bit strings, the conversion results in 0000 1000 for h=8, 0000 0101 for e=5, 0000 1100 for l=12, 0000 1100 for l=12, 0000 1111 for o=15, 0001 1011 for _=27, 0001 0111 for w=23, 0000 1111 for o=15, 0001 0010 for r=18, 0000 1100 for l=12, and 0000 0100 for d=4. Note that the strings can also be in other bit sizes, such as 4, 16, and others.

In block 410, the message, as manifested via the second numeral system, is combined into a character sequence. Such combination is automatic, whether directly and/or indirectly. Using the example above containing the strings 0000 1000, 0000 0101, 0000 1100, 0000 1100, 0000 1111, 0001 1011, 0001 0111, 0000 1111, 0001 0010, 0000 1100, 0000 0100, then the strings are combined into a character sequence 00001000000001010000110000011000000111-10001101100010111000011110001001000000011 0000000-100.

In block 412, a plurality of subsequences are generated, via segmenting by alternation, at least two of the variables from block 402. Such generation is automatic, whether directly and/or indirectly. Using the examples above containing the sequence 00001000000001010000110000001-100000011110001101100010111 0000111100010001000-00110000000100 and where variable A is set to 17 and variable B is set to 13, then the subsequences are generated via alternating the variables to segment the stream. Therefore, the sequence 00001000000001010000110000011-000000111100011011000010111 000011110001001-00000110000000100 is segmented via alternating variable A and variable B such that the subsequences are generated via alternation and correspondingly sized according to alternation based on variable A and variable B. Resultantly, the subsequences are 0000 1000 0000 01010 (17 bits according to variable A), 0001 1000 00011 (13 bits according to variable B), 0000 0011 1100 01101 (17 bits according to variable A), 1000 1011 10000 (13 bits according to variable B), 1111 0001 0010 00001 (17 bits according to variable A), and 1000 0000 100 (11 bits according to variable B).

In block 414, the subsequences are converted into other subsequences using at least one of the variables, as provided via the block 402, different from the variables already used, as described above. Due to a value of the at least one of the variables being different from the variables already used, such conversion results in the other subsequences being of different length from the subsequences generated via the block 412. Such conversion is automatic, whether directly and/or indirectly.

Using the example above where the subsequences 0000 1000 0000 01010, 0001 1000 00011, 0000 0011 1100 01101, 1000 1011 10000, 1111 0001 0010 00001, and 1000 0000 100 are based on variable A and variable B, then such subsequences are converted into the other subsequences using variable C, which is set to 24. The conversion is based on a difference between variable C and a length of each of the subsequences. For example, the conversion of a 17 bit subsequence, based on variable A, into a 24 bit subsequence, based on variable C, is performed via adding 7 bits to the 17 bit subsequence to total to the 24 bit subsequence. Likewise, the conversion of a 13 bit subsequence, based on variable B, into a 24 bit subsequence, based on variable C, is performed via adding 11 bits to the 13 bit subsequence to total to the 24 bit subsequence. Therefore, the other subsequences result in different bit lengths from the subsequences as generated via the block 412. Resultantly, as converted via adding bits corresponding to the difference between variable C and relevant string length of the old subsequences, such as 17 or 13, the other subsequences are 0000 0000 0001 0000 0000 1010, 0000 0000 0000 0011 0000 0011, 0000 0000 0000 1111 1000 1101, 0000 0000 0001 0001 0111 0000, 0000 0001 1110 0010 0100 0001, and 0000 0000 0000 0100 0000 0100. Note that in other embodiments, the at least one variable is not different from at least one of the variables already used.

In block 416, the other subsequences are transmitted. Such transmission can be manual and/or automatic, direct and/or indirect, wireless and/or wired, encrypted and/or unencrypted.

For decoding based on process 400, using the examples above, then start with a received stream 000000000001000000001010000000000000011000000-110000000000001111100011 0100000000000100010111-00000000000111100010010000010000000000000010000-000100. Then, the received stream is converted into word length from based on variable C, which is 24. Such conversion results in 0000 0000 0001 0000 0000 1010, 0000 0000 0000 0011 0000 0011, 0000 0000 0000 1111 1000 1101, 0000 0000 0001 0001 0111 0000, 0000 0001 1110 0010 0100 0001, and 0000 0000 0000 0100 0000 0100. Then, using variables A and B drop the added bits from each word, which results in 0000 1000 0000 01010, 0001 1000 00011, 0000 0011 1100 01101, 1000 1011 10000, 1111 0001 0010 00001, 1000 0000 100. Then, remove any separation, which results in 00001000000001010000110000001100000011-110001101100010111100000111 10001001000000110000-000100. Then, segment the stream into 8 bit words, which results in 0000 1000, 0000 0101, 0000 1100, 0000 1100, 0000 1111, 0001 1011, 0001 0111, 0000 1111, 0001 0010, 0000 1100, 0000 0100. Then, convert the words into decimal equivalent, which results in 8, 5, 12, 12, 15, 27, 23, 15, 18, 12, 4. Then, use the lookup table and replace with hello_world.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

While the preferred embodiment to the disclosure had been described, those skilled in the art, both now and in the future, may make various improvements and/or enhancements which fall within the scope of the claims which follow. These claims should be construed to maintain the proper protection for the disclosure first described.

What is claimed is:

1. A system comprising:
   at least one processor; and
   at least one memory, having stored thereon computer program code that, when executed by the at least one processor, controls the at least one processor to:
   receive a first sequence of values;
   segment the first sequence of values into a plurality of first subsequences each having a first length and a plurality of second subsequences each having a second length;
   modify each of the plurality of first subsequences by inserting one or more values into each of the plurality of first subsequences to create a plurality of modified first subsequences each having a third length;
   modify each of the plurality of second subsequences by inserting one or more values into each of the plurality of second subsequences to create a plurality of modified second subsequences each having the third length;
   combine the plurality of modified first subsequences and the plurality of modified second subsequences to create a second sequence of values; and
   output the second sequence of values.

2. The system of claim 1, wherein the computer program code, when executed by the at least one processor, further controls the at least one processor to output the second sequence of values for transmission to a destination device.

3. The system of claim 2, wherein the first, second, and third lengths are known by the destination device.

4. The system of claim 1, wherein the computer program code, when executed by the at least one processor, further controls the at least one processor to modify the first, second, and third lengths as a function of time.

5. The system of claim 1, wherein the computer program code, when executed by the at least one processor, further controls the at least one processor to:
   receive a third sequence of values;
   segment the third sequence of values into a third subsequence and a fourth subsequence each having a fourth length;

modify the third subsequence by removing one or more values from the third subsequence to create a modified third subsequence of a fifth length;

modify the fourth subsequence by removing one or more values from the fourth subsequence to create a modified fourth subsequence of a sixth length; and combine the modified third subsequence and the modified fourth subsequence to create a fourth sequence of values.

6. The system of claim 1, wherein the computer program code, when executed by the at least one processor, further controls the at least one processor to:

receive a third sequence of values;

segment the third sequence of values into a plurality of third subsequences and a plurality of fourth subsequences each having a fourth length;

modify each of the plurality of third subsequences by removing one or more values from each of the plurality of third subsequences to create a plurality of modified third subsequences each having a fifth length;

modify each of the plurality of fourth subsequences by removing one or more values from each of the plurality of fourth subsequences to create a plurality of modified fourth subsequences each having a sixth length; and combining the plurality of modified third subsequences and the plurality of modified fourth subsequences to create a fourth sequence of values.

7. The system of claim 5, wherein the fourth length is the same as the third length, the fifth length is the same as the first length, the sixth length is the same as the second length, and the fourth sequence of values is identical to the first sequence of values.

8. The system of claim 1, further comprising a switch configured to switch between a first mode and a second mode, wherein the computer program code, when executed by the at least one processor, further controls the at least one processor to:

segment the first sequence of values into the plurality of first subsequences each having the first length based on the switch being in the first mode, and segment the first sequence of values into the plurality of second subsequences each having the second length based on the switch being in the second mode.

9. A system comprising a plurality of circuits configured to:

receive a first sequence of values;

segment the first sequence of values into a plurality of first subsequences each having a first length and a plurality of second subsequences each having a second length;

modify each of the plurality of first subsequences by inserting one or more values into each of the plurality of first subsequences to create a plurality of modified first subsequences each having of a third length;

modify each of the plurality of second subsequences by inserting one or more values into each of the plurality of second subsequences to create a plurality of modified second subsequences of the third length;

combine the plurality of modified first subsequences and the plurality of modified second subsequences to create a second sequence of values; and output the second sequence of values.

10. The system of claim 9, wherein the outputting comprises outputting the second sequence of values for transmission to a destination device.

11. The system of claim 10, wherein the first, second, and third lengths are known by the destination device.

12. The system of claim 9 further comprising selecting at least one of the first, second, and third lengths as a function of time.

13. The system of claim 9, wherein the plurality of circuits are further configured to recreate the first sequence of values by:

receiving a third sequence of values;

segmenting the third sequence of values into a third subsequence and a fourth subsequence each having the third length;

modifying the third subsequence by removing one or more values from the third subsequence to create a modified third subsequence of the first length;

modify the fourth subsequence by removing one or more values from the fourth subsequence to create a modified fourth subsequence of the second length; and combining the modified third subsequence and the modified fourth subsequence to recreate the first sequence of values.

14. The system of claim 9, wherein the plurality of circuits are further configured to recreate the first sequence of values by:

receiving, at the processor, a third sequence of values;

segmenting, by the processor, the third sequence of values into a plurality of third subsequences and a plurality of fourth subsequences each having a fourth length;

modifying, by the processor, each of the plurality of third subsequences by removing one or more values from each of the plurality of third subsequences to create a plurality of modified third subsequences each having a fifth length;

modifying, by the processor, each of the plurality of fourth subsequences by removing one or more values from each of the plurality of fourth subsequences to create a plurality of modified fourth subsequences each having a sixth length; and combining, by the processor, the plurality of modified third subsequences and the plurality of modified fourth subsequences to recreate the first sequence of values.

15. The system of claim 9, wherein the plurality of circuits are further configured to output, after outputting the second sequence of values, a third sequence of values comprising random values.

16. the system of claim 9, further comprising a switch configured to switch between a first mode and a second mode, wherein the plurality of circuits are configured to:

segment the first sequence of values into the plurality of first subsequences each having the first length based on the switch being in the first mode, and segment the first sequence of values into the plurality of second subsequences each having the second length based on the switch being in the second mode.

17. A system comprising a plurality of circuits configured to:

receive a first sequence of values;

segment the first sequence of values into a plurality of first subsequences and a plurality of second subsequences each having a first length;

modify each of the plurality of first subsequences by removing one or more values from each of the plurality of first subsequences to create a plurality of modified first subsequences each having a second length;

modify each of the plurality of second subsequences by removing one or more values from each of the plurality of second subsequences to create a plurality of modified second subsequences each having a third length; and combine the modified first subsequence and the modified second subsequence to create a second sequence of values.

18. The system of claim 17, wherein the first sequence of values is encrypted, and the second sequence of values is unencrypted.

19. The system of claim 17, wherein the plurality of circuits are further configured to:

receive the first sequence of values from a source device; and output the second sequence of values to a destination device.

20. The system of claim 17, wherein at least one of the first, second, and third lengths changes as a function of time.

* * * * *